INVENTOR.
BY Masataka Nisida

United States Patent Office 3,256,768
Patented June 21, 1966

1

3,256,768
METHOD OF MEASURING RESIDUAL STRESS
IN A BODY
Masataka Nisida, Omiya, Japan, assignor to Rikagaku
Kenkyusho (The Institute of Physical and Chemical
Research), Tokyo, Japan
Filed May 17, 1961, Ser. No. 110,811
4 Claims. (Cl. 88—14)

The present invention relates to methods for measuring a state of stress on a surface of metal or other opaque material due not only to an applied load, but also to dead loads and residual stresses within the structure.

Heretofore, for measuring stress due to applied load as well as residual stress in metal, the following two methods have been mainly utilized.

(1) X-ray diffraction method.
(2) Gunnert's method.

However, the X-ray diffraction method is restricted in its utilization by the kind of material of the object to be measured, for example, the condition of micro-structure of the metal, and in most cases, it cannot be applied to special alloys. Moreover, high precision of measurement cannot be achieved.

Gunnert's method requires the provision of a circular groove of 20 mm. outside diameter and about 15 mm. in depth to be formed in the part to be analyzed.

Accordingly, Gunnert's method is practical, only if the stress distribution in the region around said groove is uniform or the structure is large enough not to be affected by such a cut.

According to the present invention, it is possible to measure photoelastically the state of stress on a surface of a metal structure by means of a very small circular hole which is drilled into the structure to a certain depth through a photoelastic film which is formed on the surface of the structure.

The present invention is carried out as follows.

After a small area of the surface of structure to be measured has been polished in order to give sufficient light reflection for observing a photoelastic effect, a thin film of photoelastic material is applied onto said surface area, and through this film a circular hole of small diameter is drilled into said object to be measured to a depth which is comparable with said diameter. Then a polarized light from a reflection type polariscope or other means of polarization is projected perpendicularly onto said surface area, whereby the directions and magnitudes of principal stresses in the surface of said object are determined simply by counting the order of monochromatic fringes or colored bands of a photoelastic stress pattern which appears in a reflected light through the film.

Figure 1:
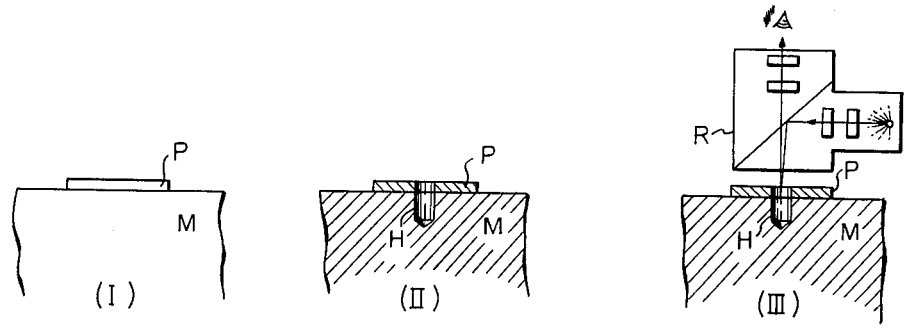

For a better understanding of the invention, a detailed description of a typical embodiment of the present invention will be given in reference to the accompanying drawings, in which:

FIG. 1 shows schematically the principle and the method of the present invention, wherein (I) shows an object M to be measured with a photoelastic film P applied thereto, (II) shows a small circular hole H drilled through said film P into said object M, and (III) shows a device in which a polarized light is projected by means of a reflection type polariscope R perpendicularly onto a surface of an object M.

Figure 2:
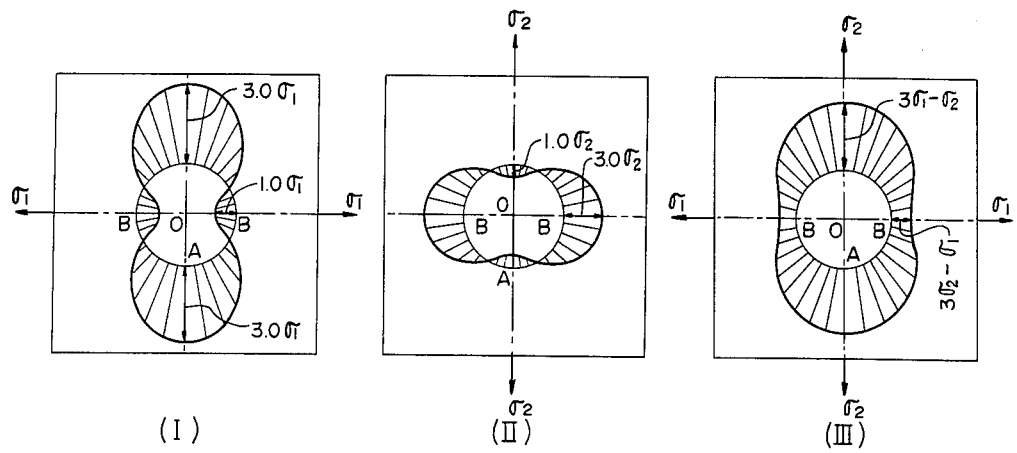

FIG. 2 shows a distribution of stress $\sigma_\theta$ along the edge of a circular hole on a surface of an object to be measured, produced due to the disturbance of stress state by drilling said circular hole into said object, wherein (I) and (II) each shows a distribution of $\sigma_\theta$ when there exists only $\sigma_1$ or $\sigma_2$ individually as the principal stress to be measured, and (III) shows a distribution of $\sigma_\theta$ when there exists $\sigma_1$ and and $\sigma_2$ concurrently.

2

Figure 3:
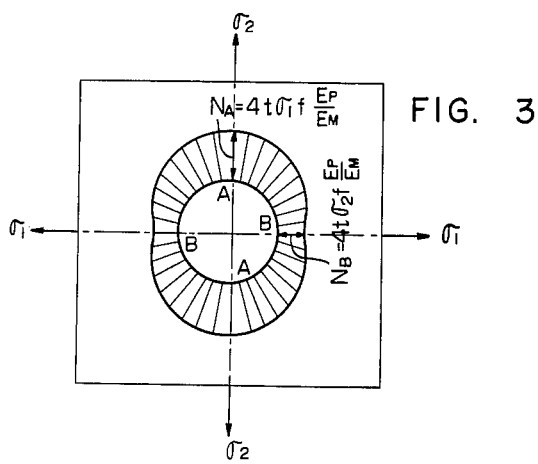

FIG. 3 shows a distribution of the order of the photoelastic stress pattern N generated along the edge of a drilled circular hole in a photoelastic film when there exist two principal stresses $\sigma_1$ and $\sigma_2$ concurrently in an object.

Referring to FIG. 1, after a small area of the surface of a structure M to be measured has been polished in order to give a sufficient light reflection, a thin film of photoelastic material P is applied onto said surface area, and through this film P a circular hole H of small diameter is drilled into said object M to a depth which is comparable with the diameter of said circular hole H.

Then, a polarized light from a reflection type polariscope R or other means of polarization is projected perpendicularly onto said surface area, whereby a photoelastic stress pattern corresponding to the stress state to be measured can be observed, and by a relatively simple process of counting of colored bands or monochromatic fringes, the required stress state can be determined.

Since the size of said drilled hole H has little effect on the sensitivity of measurement, it may be as small as 0.5 mm. in diameter.

Within a certain range, on a surface of the structure wherein exists only a principal stress $\sigma_1$ or $\sigma_2$, the distribution of stress is disturbed by the drilling of the circular hole H, and thereby the distribution of stress $\sigma_\theta$ along the edge of said hole becomes as shown in FIG. 2 (I) or FIG. 2 (II) respectively. When there exist two principal stresses $\sigma_1$ and $\sigma_2$ concurrently, the algebraic sum of the stresses in FIG. 2 (I) and FIG. 2 (II) is produced. Therefore, as shown in FIG. 2 (III), the stresses at A and B, the end points of the diameters perpendicular to the direction of each principal stress, should be $3\sigma_1-\sigma_2$ and $3\sigma_2-\sigma_1$ respectively.

Accordingly, if the Poisson's ratio $\nu$ of the photoelastic film P is equal to that of the object to be measured, the photoelastic stress pattern, which is observed by means of a reflection type polariscope R or the other polarizing apparatus, corresponds to a remainder stress, which is obtained by subtracting algebraically the uniform distribution of $\sigma_1$ and $\sigma_2$ from the stress distribution in the vicinity of said hole H on the surface of the object produced by drilling (FIG. 3).

The change of stress distribution which is produced by drilling on a surface of the object to be measured, multiplied by a ratio $E_P/E_M$, is indicated as a photoelastic stress pattern in the photoelastic film, where $E_P$ and $E_M$ are Young's modulus, respectively, of the photoelastic film and the object to be measured.

Therefore, in the result, the stress distribution which is generated along the edge of the circular hole H in the photoelastic film is as shown in FIG. 3, appearing 2.0 $\sigma_1$ $E_P/E_M$ at A and 2.0 $\sigma_2$ $E_P/E_M$ at B respectively.

Considering that the polarized light passes twice through the photoelastic film, each photoelastic fringe order $N_A$ at A and $N_B$ at B is expressed as follows:

$$N_A = 2t \times 2\sigma_1 f\, E_P/E_M \quad (1)$$

$$N_B = 2t \times 2\sigma_2 f\, E_P/E_M \quad (2)$$

from which the required values of the principal stresses $\sigma_1$ and $\sigma_2$ are obtained as follows:

$$\sigma_1 = \frac{N_A}{4tf} \frac{E_M}{E_P} \quad (3)$$

$$\sigma_2 = \frac{N_B}{4tf} \frac{E_M}{E_P} \quad (4)$$

where $t$ denotes the thickness of the photoelastic film (mm.), and $f$ denotes the photoelastic fringe value of the film (fringe order/kg./mm.² stress/mm. thickness).

Inspection of the expressions (3) and (4) shows that the required stresses $\sigma_1$ and $\sigma_2$ can be obtained by measuring the photoelastic fringe order $N_A$ and $N_B$ of the photoelastic film, provided that the value of $E_M$, $E_P$, $t$ and $f$ are already known.

Since the diameters AA and BB, which give the directions of principal stresses $\sigma_1$ and $\sigma_2$, coincide with the symmetrical axes of photoelastic stress pattern, they are easily determined.

When a higher sensitivity than that obtained by the above-mentioned method is desired, either of the following methods or any combination of them may be utilized in conjunction with the above-mentioned method.

(I) To use white light source instead of a monochromatic one for obtaining a series of various color bands from which $N_A$ and $N_B$ are found by color matching.

(II) To utilize a Babinet's compensator or Babinet-Soleil's compensator.

When the difference between the values of Poisson's ratio of the materials of the photoelastic film and of the object to be measured must be considered, the relations between fringe orders $N_A$, $N_B$ and the required principal stresses $\sigma_1$, $\sigma_2$ may be actually determined by previous calibration, referring to the values of $t$, $f$, $E_P$ and $\nu_P$ of the material of the photoelastic film and the values of $E_M$ and $\nu_M$ of the material of the object to be measured.

What I claim is:

1. A method for determining the state of stress existing in a stressed element, said method comprising uniformly applying a photoelastic film to said element at a location at which the state of stress is desired, forming a circular hole through said film and into said element to a determinable depth in the latter, said hole in the element causing redistribution of stress thereat, and irradiating said film with polarized light in a direction perpendicular to said surface to produce a photoelastic stress pattern in said film corresponding to the state of stress existing at said location whereby the principal stresses at said location can be evaluated.

2. A method as claimed in claim 1, wherein said hole is formed by drilling the hole through said film and into said element to a depth between about 1.0 to 1.2 times the diameter of said hole.

3. A method as claimed in claim 1, wherein said hole has a diameter of 0.5 mm.

4. A method for determining the state of stress existing in a stressed element, said method comprising uniformly applying a photoelastic film to said element at a location at which the state of stress is desired, forming a hole in said element beneath said film, said hole in the element causing redistribution of stress thereat, and irradiating said film with polarized light in a direction perpendicular to said surface to produce a photoelastic stress pattern in said film corresponding to the state of stress existing at said location whereby the principal stresses at said location can be evaluated.

References Cited by the Examiner

UNITED STATES PATENTS

| | | | |
|---|---|---|---|
| 2,014,688 | 9/1935 | Mabboux | 88—14 |
| 2,625,850 | 1/1953 | Stanton | 88—14 |
| 2,966,673 | 12/1960 | Guernsey | 88—14 X |
| 3,034,341 | 5/1962 | Golubovic | 88—14 X |
| 3,034,344 | 5/1962 | Zandman et al. | 88—14 X |
| 3,067,606 | 12/1962 | Oppel | 88—14 X |
| 3,071,963 | 1/1963 | Gunnert | 73—88 |
| 3,077,813 | 2/1963 | Zandman | 88—14 |

JEWELL H. PEDERSEN, *Primary Examiner.*

JULIA E. COINER, *Examiner.*

T. L. HUDSON, *Assistant Examiner.*